(12) United States Patent
Getpreecharsawas et al.

(10) Patent No.: US 10,086,336 B2
(45) Date of Patent: Oct. 2, 2018

(54) ULTRA-THIN NANOMETER SCALE POLYMERIC MEMBRANES

(71) Applicants: Jirachai Getpreecharsawas, Rochester, NY (US); David A. Borkholder, Canandaigua, NY (US)

(72) Inventors: Jirachai Getpreecharsawas, Rochester, NY (US); David A. Borkholder, Canandaigua, NY (US)

(73) Assignee: Rochester Institute of Technology, Rochester, NY (US)

( * ) Notice: Subject to any disclaimer, the term of this patent is extended or adjusted under 35 U.S.C. 154(b) by 113 days.

(21) Appl. No.: 15/349,613

(22) Filed: Nov. 11, 2016

(65) Prior Publication Data

US 2017/0136419 A1 May 18, 2017

Related U.S. Application Data

(60) Provisional application No. 62/254,507, filed on Nov. 12, 2015.

(51) Int. Cl.
| | | |
|---|---|---|
| *B01D 67/00* | (2006.01) | |
| *B01D 61/00* | (2006.01) | |
| *B01D 69/12* | (2006.01) | |
| *B01D 61/02* | (2006.01) | |

(52) U.S. Cl.
CPC ....... *B01D 67/0023* (2013.01); *B01D 61/027* (2013.01); *B01D 67/0088* (2013.01); *B01D 69/12* (2013.01)

(58) Field of Classification Search
None
See application file for complete search history.

(56) References Cited

U.S. PATENT DOCUMENTS

| | | |
|---|---|---|
| 4,277,344 A | 7/1981 | Cadotte |
| 5,702,503 A | 12/1997 | Tse |
| 2009/0277837 A1 | 11/2009 | Liu et al. |
| 2011/0042299 A1* | 2/2011 | Zhang ................ B01D 65/003 210/490 |
| 2011/0244443 A1* | 10/2011 | van Rijn ............. A61M 1/3633 435/2 |
| 2012/0178834 A1 | 7/2012 | Linder et al. |

OTHER PUBLICATIONS

Daniel J. Murray, Dustin D. Patterson, Payam Payamyar, Radha Bhola, Wentao Song, Markus Lackinger, A. Dieter Schluter, and Benjamin T. King, Large Area Synthesis of a Nanoporous Two-Dimensional Polymer at the Air/Water Interface. J. Am. Chem. Soc., 2015, pp. 3450-3453, vol. 137, DOI: 10.1021/ja512018j.

(Continued)

*Primary Examiner* — Krishnan S Menon
(74) *Attorney, Agent, or Firm* — Bond, Schoeneck & King, PLLC; Joseph Noto

(57) ABSTRACT

Ultra-thin nanometer-sealer freestanding polymeric membranes and methods for producing ultra-thin nanometer-scale freestanding recast membranes and ultra-thin nanometer-scale freestanding cross-linked membranes with solid internal backbone are disclosed.

14 Claims, 8 Drawing Sheets

(56) References Cited

OTHER PUBLICATIONS

Gu JE1, Lee S, Stafford CM, Lee JS, Choi W, Kim BY, Baek KY, Chan EP, Chung JY, Bang J, Lee JH., Molecular layer-by-layer assembled thin-film composite membranes for water desalination, Advanced Materials, Sep. 14, 2013, pp. 4778-4782, 25(34), doi: 10.1002/adma.201302030. Epub Jul. 12, 2013 PMID: 23847127.

R.L. Riley, H.K. Lonsdale, C.R. Lyons, U. Merten, Preparation of ultrathin reverse osmosis membranes and the attainment of theoretical salt rejection, Journal of Applied Polymer Science, 1967, pp. 2143-2158, vol. 11, DOI: 10.1002/app.1967.070111106.

International Search Report Form PCT/ISA/220, International Application No. PCT/US2016/061608, pp. 1-6, dated Jan. 26, 2017.

* cited by examiner

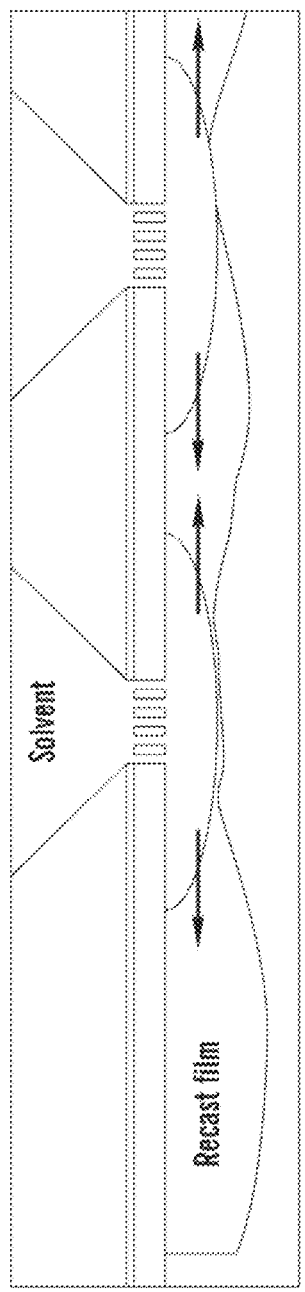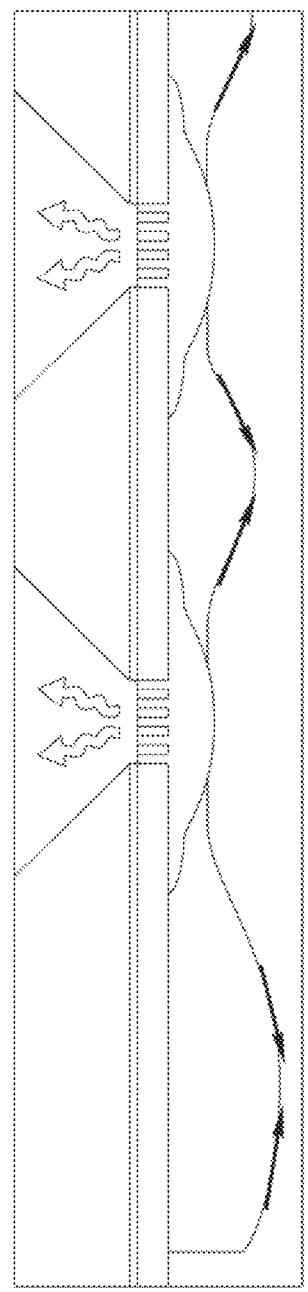
FIG. 2A
FIG. 2B

ULTRA-THIN NANOMETER SCALE POLYMERIC MEMBRANES

CROSS REFERENCE

This application claims the benefit of the filing date of U.S. Provisional Patent Application Ser. No. 62/254,507, filed Nov. 12, 2015, which is hereby incorporated by reference in its entirety.

This disclosure was made with government support under grant number 11P-1237699 awarded by NSF Partnership for Innovation. The government has certain rights in this disclosure.

FIELD

This disclosure relates to ultra-thin nanometer-scale polymeric membranes and methods for their production.

BACKGROUND

The casting of the solution of resin dispersion is a conventional method of making a micrometer-scale freestanding membrane. However, it is challenging for this conventional method to produce an ultra-thin freestanding membrane in nanometer scale due to the difficulty in handling such ultra-thin material. The art lacks a solution to the handling problem and lacks the ability for producing a freestanding recast membrane having thickness in nanometer scale over an ultra-thin nanoporous substrate.

The pore-filling method is the prior technology used to make freestanding membranes by filling the pores of a substrate with polymer. This technology relies on the porous substrate with specific pore size and its uniformity to guarantee the complete filling of all pores. Therefore, the thickness of polymeric membrane is dictated by the thickness of the substrate, which is usually thick in order to accommodate large pores. However, the thickness also depends on the polymer used.

It would seem obvious to another researcher that spin coating would be a preferred method to casting when making a uniform nanometer-scale film from the solution of resin dispersion. To make a freestanding membrane, the thin film would need to be transferred to a porous support; otherwise, the solution would need to be spin-coated on a porous substrate directly. Since the substrate cannot be too thick, it is more likely that the porous substrate would not survive the spin coating process. In addition, the polymer might get into the pores and across to the other side, thus resulting in a thicker membrane if a thicker substrate is used, or even worse, leaving pin holes in the membrane.

Conventionally ultra-thin nanometer-scale freestanding cross-link membranes are synthesized by a method called the interfacial polymerization, which is processed over a thick and sturdy porous support resulting in polymerized membrane on one side of the support with partial intrusion into the pores.

Prior technology is based on stacking different types of support to enhance the strength of the membrane, while minimizing the resistance to the flow across the membrane by using supports with progressively larger pore size.

SUMMARY

In accordance with an aspect of the present disclosure, a process for producing an ultra-thin nanometer-scale polymeric membrane includes: forming a polymer film on a first side of a nanoporous substrate including a porous region and non-porous regions surrounding the porous region; swelling the polymer film on the first side of the nanoporous substrate by applying a solvent on a second side of the nanoporous substrate opposite the first side, which solvent migrates from the second side of the nanoporous substrate through the porous region to the first side of the nanoporous substrate; and simultaneously shrinking the polymer film formed over the non-porous regions and stretching the polymer film formed over the porous region on the first side of the nanoporous substrate by evaporating the solvent from the second side of the nanoporous substrate while limiting evaporation of the solvent from the first side of the nanoporous substrate yielding an ultra-thin film on the nanoporous substrate.

In accordance with an aspect of the present disclosure, there is provided a process of producing an ultra-thin nanometer-scale freestanding polymeric membrane including: dispensing a solution of resin dispersion over a nanoporous substrate; allowing the solution to spread completely over the porous region; letting the solvent evaporate yielding a thin film recast; flipping the substrate over, confining the recast in an enclosed space, and adding a solvent on the other side of the substrate; letting the recast absorb the solvent through the ultra-thin nanoporous substrate; and allow solvent evaporation through the nanoporous substrate yielding an ultra-thin recast film on the nanoporous substrate.

In accordance with another aspect of the present disclosure, there is provided an ultra-thin nanometer-scale freestanding polymeric membrane on a nanoporous substrate produced in accordance with the above method.

In accordance with another aspect of the present disclosure, there is provided a process of producing an ultra-thin nanometer-scale freestanding cross-linked membrane enveloping a solid backbone including: introducing an aqueous solution of the first monomer on one side of an ultra-thin nanoporous support; introducing an organic solution of a second monomer on the other side of the support, wherein a cross-linking of the two monomers commences at the interface of these two immiscible solutions; allowing the diffusion of each monomer across the cross-linked membrane to progress over time, leading to a thicker membrane and eventually enveloping the support; and rinsing oft both solutions resulting in the cross-linked membrane with the ultra-thin nanoporous support as its internal backbone.

In accordance with another aspect of the present disclosure, there is provided an ultra-thin nanometer-scale freestanding cross-linked membrane having a solid internal backbone produced in accordance with the above method.

These and other aspects of the present disclosure will become apparent upon a review of the following detailed description and the claims appended thereto.

BRIEF DESCRIPTION OF THE DRAWINGS

FIG. 2 is a representation depicting pulling by solvent evaporation and stretching by film shrinkage yielding a thinner membrane over the porous substrate;

FIG. 3 is a representation in accordance with an embodiment of the present disclosure depicting processing steps of synthesizing an ultra-thin nanometer-scale freestanding polymeric cross-linking membrane enveloping an ultra-thin porous support as its backbone;

DETAILED DESCRIPTION

Ultra-Thin Nanometer-Scale Membranes.

An embodiment of a process for producing an ultra thin nanometer-scale polymeric membrane includes forming a polymer film on a first side of a nanoporous substrate including a porous region and non-porous regions surrounding the porous region. The polymer film on the first side of the nanoporous substrate is swelled by applying a solvent on a second side of the nanoporous substrate opposite the first side, which solvent migrates from the second side of the nanoporous substrate through the porous region to the first side of the nanoporous substrate. Simultaneously the polymer film formed over the non-porous regions is shrunk and the film formed over the porous region on the first side of the nanoporous substrate is stretched by evaporating the solvent from the second side of the nanoporous substrate while limiting evaporation of the solvent from the first side of the nanoporous substrate. Evaporating solvent from the second side of the nanoporous substrate while limiting evaporation of the solvent from the first side of the nanoporous substrate can be accomplished by methods including preventing evaporation from the first side while allowing evaporation from the second side; and allowing evaporation from the second side at a rate greater than the rate of evaporation from the first side, and the like.

An embodiment of a process for producing an ultra-thin nanometer-scale freestanding polymeric membrane includes the use of a dispersion of resin in a solvent and an ultra-thin nanoporous substrate. FIG. 1 is a representation of an embodiment demonstrating steps for producing a recast membrane over an ultra-thin nanoporous substrate. The processing steps produce an ultra-thin nanometer-scale freestanding polymeric recast membrane according to the following: (a) dispensing a solution of resin dispersion in a solvent over a first side of a nanoporous substrate having a porous region surrounded by non-porous regions; (b) allowing the solution to spread completely over the porous region of the first side of the nanoporous substrate; (c) allowing the solvent to evaporate yielding a thin film recast on the porous region of the first side of the nanoporous substrate; (d) flipping the substrate over, confining the recast in an enclosed space, and dispensing a solvent on a second side opposite the first side of the substrate; (e) allowing the recast on the first side to absorb the solvent placed on the second side through the ultra-thin nanoporous substrate porous region; (f) as the solvent is evaporated through the nanoporous substrate, a thinner recast film is formed over the pores of the nanoporous substrate as a result.

Figure 1A:
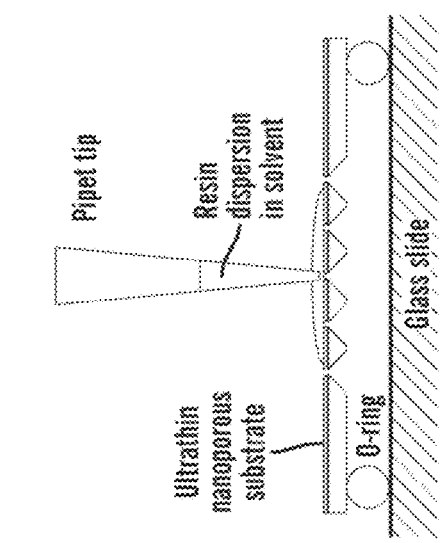
FIG. 1 is a representation in accordance with an embodiment of the present disclosure depicting processing steps of producing an ultra-thin nanometer-scale freestanding polymeric recast membrane.
Figure 1B:
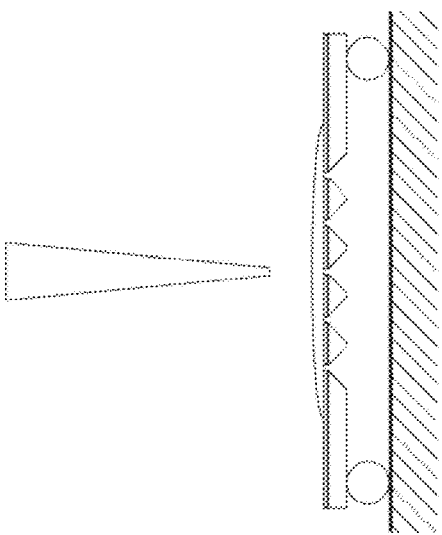
Figure 1C:
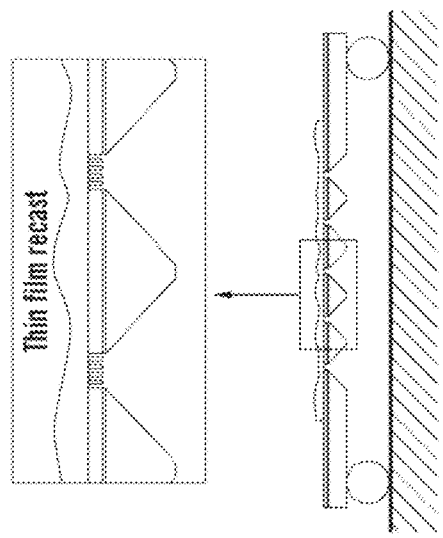

FIGS. 1(a)-(c) depict the steps involved in producing an initial thin recast film by puddle casting the solution of resin dispersion over an ultra-thin nanoporous substrate. In FIG. 1(a), the solution of resin dispersion is pipetted over the nanoporous substrate. In FIG. 1(b), the solvent is allowed to evaporate in an ambient environment. The thin recast film is formed over the nanoporous substrate as depicted in FIG. 1(c).

Figure 1D:
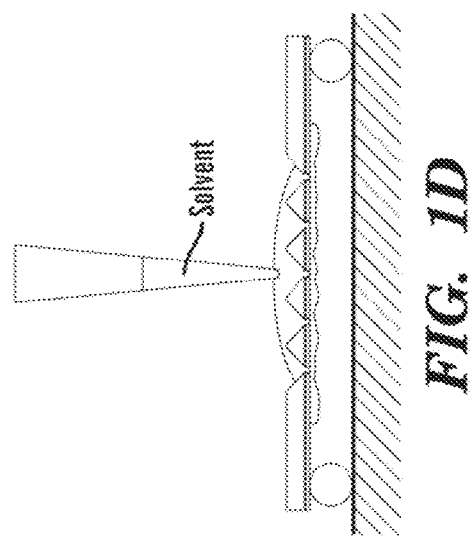
Figure 1E:
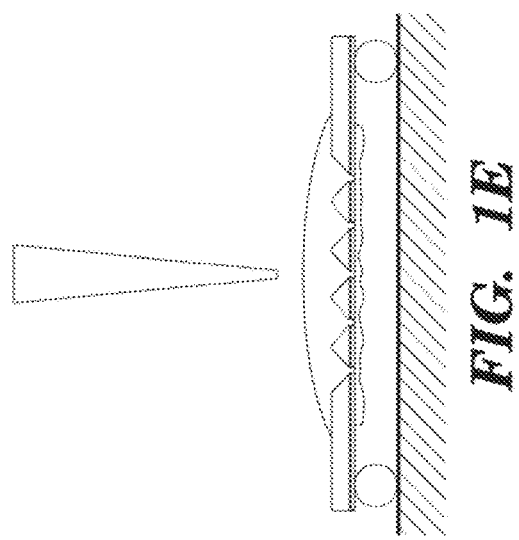
Figure 1F:
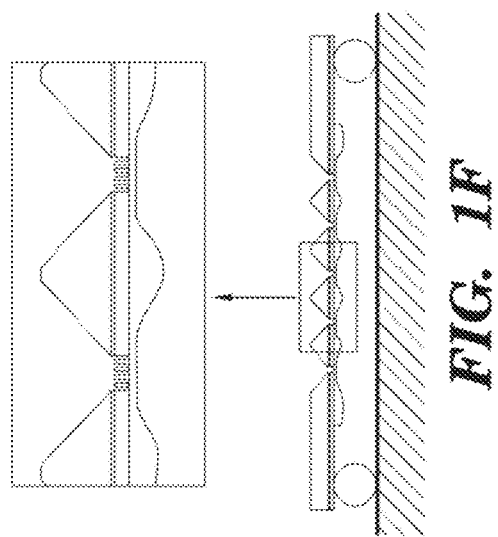

FIGS. 1(d)-(f) describe the steps involved in thinning the initial recast film by relaxing and stretching it from the other side of the nanoporous substrate. FIG. 1(d) shows the flipped-over substrate such that the recast film is confined in an enclosed space and then the solvent is pipetted over the opposite side of the substrate. FIG. 2(a) demonstrates that the solvent is absorbed by the recast through the ultra-thin porous substrate, while it is evaporated into the ambient as depicted in FIG. 2(b). In FIG. 2(b), the remaining solvent absorbed by the recast is slowly evaporated back through the nanopores of the porous region of the substrate. It is this slow evaporation in combination with the confined space preventing front side evaporation that results in an ultra-thin, stretched polymer membrane. FIG. 1(f) shows the resulting thinner recast being produced.

The pore size, pore aspect ratio, and the enclosed space can be important elements for formation of a thin, stretched polymer membrane on the nanoporous substrate. FIG. 2 shows both pulling by solvent evaporation and stretching by film shrinkage yielding a thinner membrane over the porous substrate nanopores. More specifically, in FIG. 2(a) solvent introduced from the other side of substrate is absorbed, shown by the arrows, by the recast via the substrate nanopores. The solvent absorption into the polymer through the nanopores controls the transfer rate. The recast film swells with reduced viscosity. In FIG. 2(b) limited evaporation in the confined space directs the solvent to escape back through the substrate nanopores, exerting a pulling force on the swelling portion of the recast, as shown by the arrows. The enclosed space the bottom prevents evaporation and forces evaporation to occur back through the nanopores. The constrained points of evaporation exert a pulling force on the swelled recast. Bulk regions of recast shrink and pull the thin (swelled) recast regions to produce a stretched film. The other part of the recast further away from the nanopores begins to shrink, simultaneously stretching the swelled recast located over the substrate nanopores.

Any resin dispersion solution is suitable for use in the present disclosure. Suitable resins include aqueous and solvent-based dispersions such as Nafion in 1-propanol, Nafion in 2-propanol, Nafion in ethanol, Nafion in methanol, Nafion in dimethylformamide; Kraton in toluene.

Suitable solvents are dependent on compatibility with the polymer, and include 1-propanol, 2-propanol, ethanol, methanol, dimethylformamide, and toluene. For Nafion a suitable solvent includes 1-propanol, 2-propanol, ethanol, methanol, and dimethylformamide.

Suitable substrates include porous nanocrystalline silicon (pnc-Si), nanoporous silicon nitride (NPN), nanoporous alumina, and nanoporous graphene.

Suitable thickness of porous regions of the substrate include thicknesses capable of producing an ultra-thin nanometer-scale polymeric membrane in accordance with the present disclosure, including but not limited to about 1 μm or less, preferably about tens of nanometers.

Suitable substrate pore sizes include pore diameters capable of producing an ultra-thin nanometer-scale polymeric membrane in accordance with the present disclosure, including but not limited to below about 100 nm, and below about 50 am. Suitable substrate porosity includes a porosity capable of producing an ultra-thin nanometer-scale polymeric membrane in accordance with the present disclosure, including but not limited to up to about 20% in the porous regions, and up to about 50% in the porous regions.

Preferred forms of the method were found when the volumetric ratios of 5-wt % LIQUION to 2-propanol are between 1:9 and 1:19. The corresponding Nafion membrane thickness ranges approximately from 200 nm to 100 nm given the substrate porosity in the porous region of 7.5%.

For other potential uses, this process is practically applicable to most polymers that are produced by casting. The immediate applications are the production of cation-exchange membranes, which are ultra-thin in nanometer scale and freestanding. This type of membrane includes Nafion. The thickness in nanometer-scale enables such a high permeability that will be beneficial to dialysis and faster chemical separation. Also more efficient electro-osmotic pumps can be made utilizing such an ultra-thin membrane where osmotic pressure becomes dominant force in pumping fluid. The membrane could be used in the chemical separation process. The membrane could be used as the electro-osmotic pumps for microfluidic devices in place of the conventional pneumatic pumps.

Instead of using thick substrates, this disclosure utilizes, for example, a 30 nm-thick nanoporous substrate, which is much thinner than those used by the pore-filling method. The differences from, and advantages over, the prior technology include: a resulting free-standing membrane with transport characteristics dominated by the nanometer-scale polymer and substantially independent of the substrate characteristics; no restriction on the uniformity of substrate pore size, except a limit on the maximum pore size; the process does not require a complex setup; significantly decreased production time; and reduced reagent use. The present method has the capability of producing an ultra-thin nanometer-scale freestanding membrane from a recast of resin dispersion solution. The method is applicable to most solutions of resin dispersion. This disclosure solves the problem of the handling of the ultra-thin freestanding membranes. Other advantages include batch process compatible and cost effective.

This disclosure provides an ultra-thin nanometer-scale, freestanding, pin-hole free membrane produced by casting a resin solution over an ultra-thin nanoporous substrate containing orifice-like nanopores with backside relaxation.

Ultra-Thin Nanometer-Scale Freestanding Cross-Linked Membranes with Internal Solid Backbone.

Figures 3A, 3B, 3C, 3D:
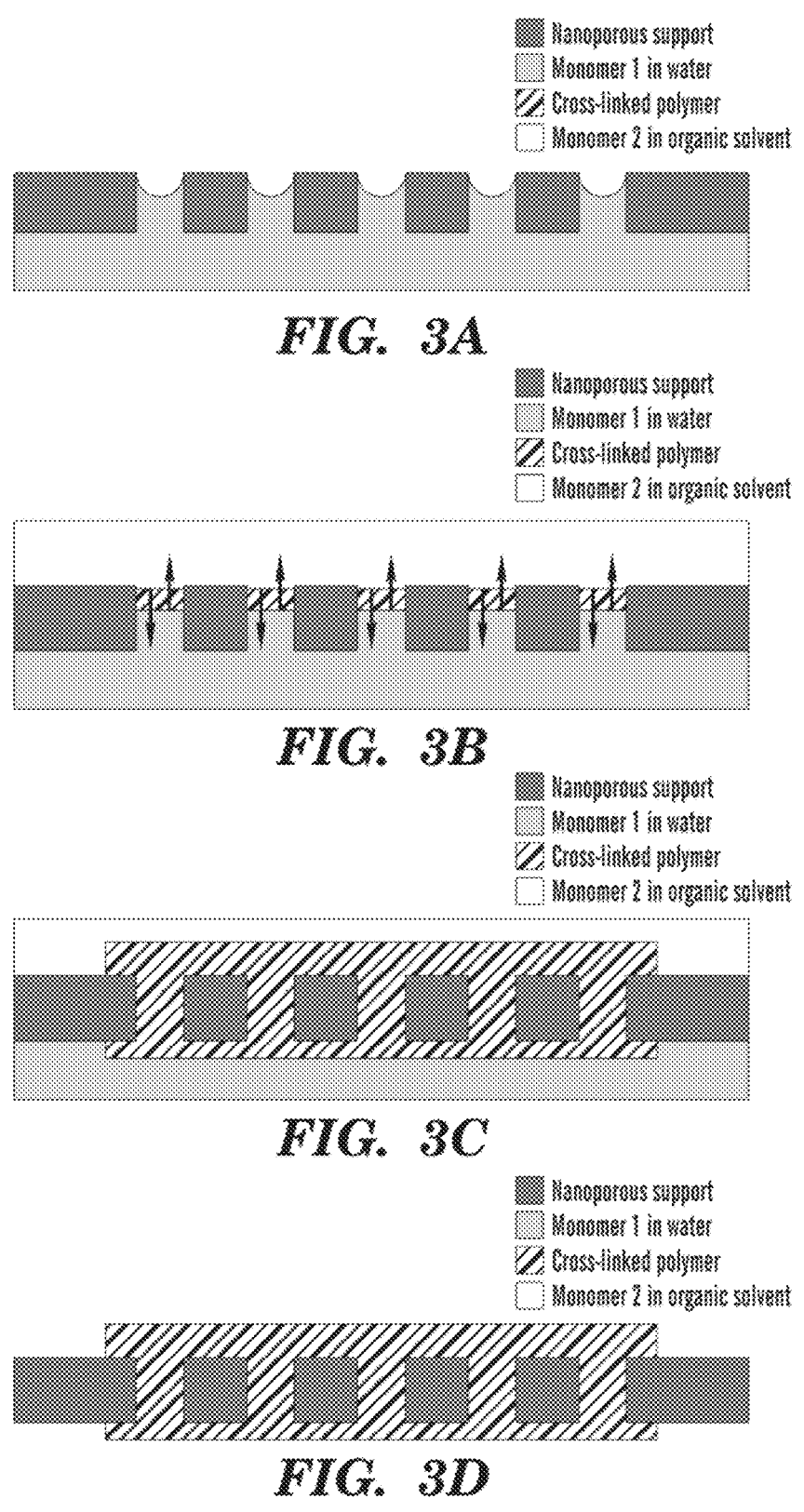

An embodiment of the synthesis of an ultra-thin nanometer-scale freestanding polymeric membrane involves the use of two immiscible solutions of two monomers and an ultra-thin nanoporous support. FIG. 3 demonstrates the steps involved in an embodiment for synthesizing a cross-linked membrane that envelops the ultra-thin nanoporous support as its backbone, thus producing an ultra-thin nanometer-scale freestanding polymeric membrane having an internal backbone support. The processing steps for synthesizing an ultra-thin nanometer-scale freestanding polymeric cross-linking membrane enveloping an ultra-thin porous support as its backbone include the following: (a) introducing an aqueous solution of a first monomer on one side of an ultra-thin nanoporous support; (b) introducing an organic solution of a second monomer on the other side of the support; the cross-linking of two monomers commences at the interface of these two immiscible solutions; (c) the diffusion of each monomer across the cross-linked membrane progresses over time, thus leading to a thicker membrane and eventually enveloping or partially enveloping the nanoporous regions of the support; and (d) rinsing off both solutions results in the cross-linked membrane with the ultra-thin nanoporous support as its internal backbone.

For other potential uses, this process is practically applicable to most polymers that are synthesized by cross-linking more monomers.

Suitable monomers include m-phenylenediamine and 1,3,5-benzenetricarbonyl chloride; disulfonated bis[4-(3-aminophenoxy)phenyl]sulfone and 1,3,5-benzenetricarbonyl chloride.

Suitable substrates include an ultra-thin porous nanocrystalline silicon (pnc-Si), ultra-thin nanoporous silicon nitride (NPN), and monolayer nanoporous graphene.

Suitable pore sizes include any pore diameters up to about 500 nm.

Suitable pore length-to-diameter aspect ratios include aspect ratios up to about 100, preferably up to about 1 given the maximum membrane thickness and pore diameter of about 200 nm and about 500 nm, respectively.

A preferred form of the disclosure depends on the time involved in the polymerization of these two monomers, but should be less than about a minute. Since the process relies on diffusion of monomers, it is a self-limiting process.

Applications include the synthesis of the aromatic polyamide membranes, which are ultra-thin in nanometer scale, freestanding, and strengthened by a solid nanoporous internal backbone. The thickness in nanometer-scale enables higher permeability, and the ultra-thin nanoporous backbone strengthens the membrane without sacrificing the permeability. These characteristics will be beneficial to existing reverse osmosis systems, such as a low-pressure reverse osmosis (RO) microsystems; chemical separations; and chip scale pumping applications, such as osmotic micropumps. It also could enable low pressure reverse osmosis enabling gravity driven systems to be realized. This would be important for remote locations or third world countries for generation of clean drinking water from sea water.

Figure 4:
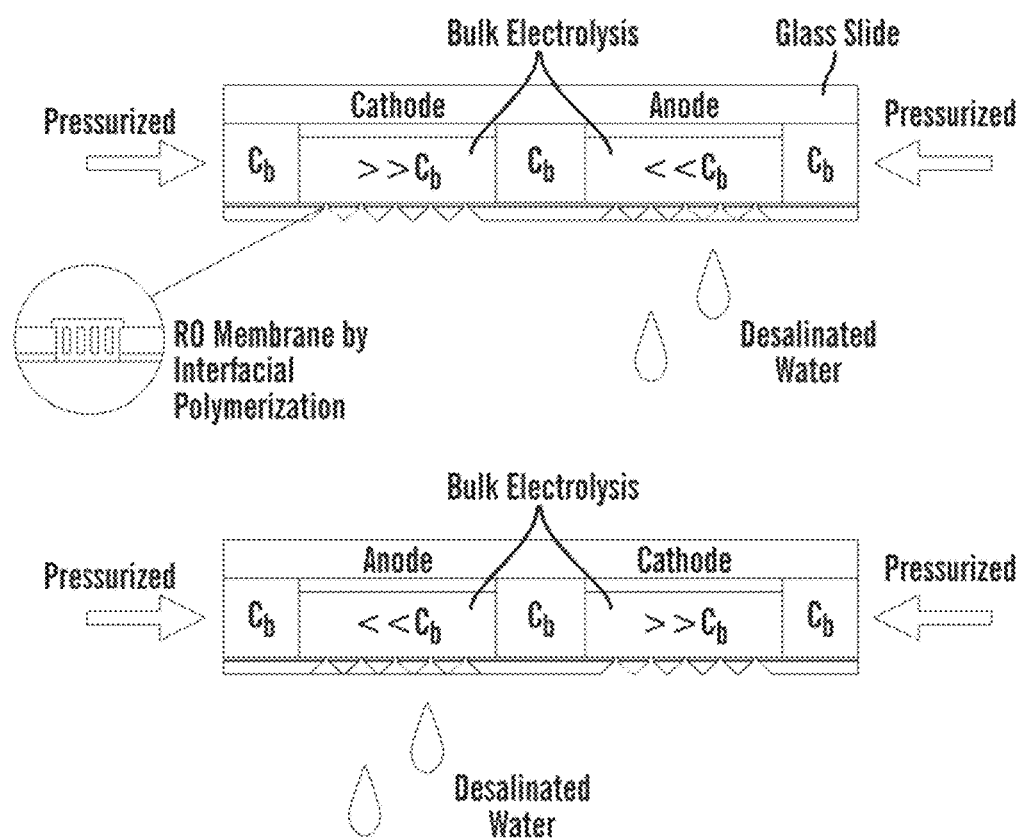
FIG. 4 is a representation depicting an ultra-thin nanometer-scale freestanding aromatic polyamide membrane in a low-pressure reverse osmosis microsystem.

FIG. 4 demonstrates the use of the ultra-thin nanometer-scale freestanding aromatic polyamide membranes with solid backbone in the low-pressure RO microsystem. The aromatic polyamide membranes play a crucial role in rejecting all salts while the pure water is filtered through the membranes.

Unlike the conventional use of a thick porous support, this disclosure utilizes a solid-state ultra-thin nanoporous membrane as the support, thus making the overall dimension much smaller, but still strong enough due to the solid structure.

Unlike the prior technology, the solid-state ultra-thin nanoporous membrane is utilized as the support, which is formed as an internal backbone of the membrane. The advantages are to reduce the overall dimension; eliminate the extra resistance to the flow due to thicker supports; be easier in handling the ultra-thin membrane particularly for the subsequent process and integration, such as ease of integration in microsystems; reduction in production time; cost effective; and batch process compatible.

The disclosure will be further illustrated with reference to the following specific examples. It is understood that these examples are given by way of illustration and are not meant to limit the disclosure of the claims that follow.

EXAMPLES—ULTRA-THIN NANOMETER-SCALE FREESTANDING RECAST MEMBRANES

Example 1

Figure 5A:
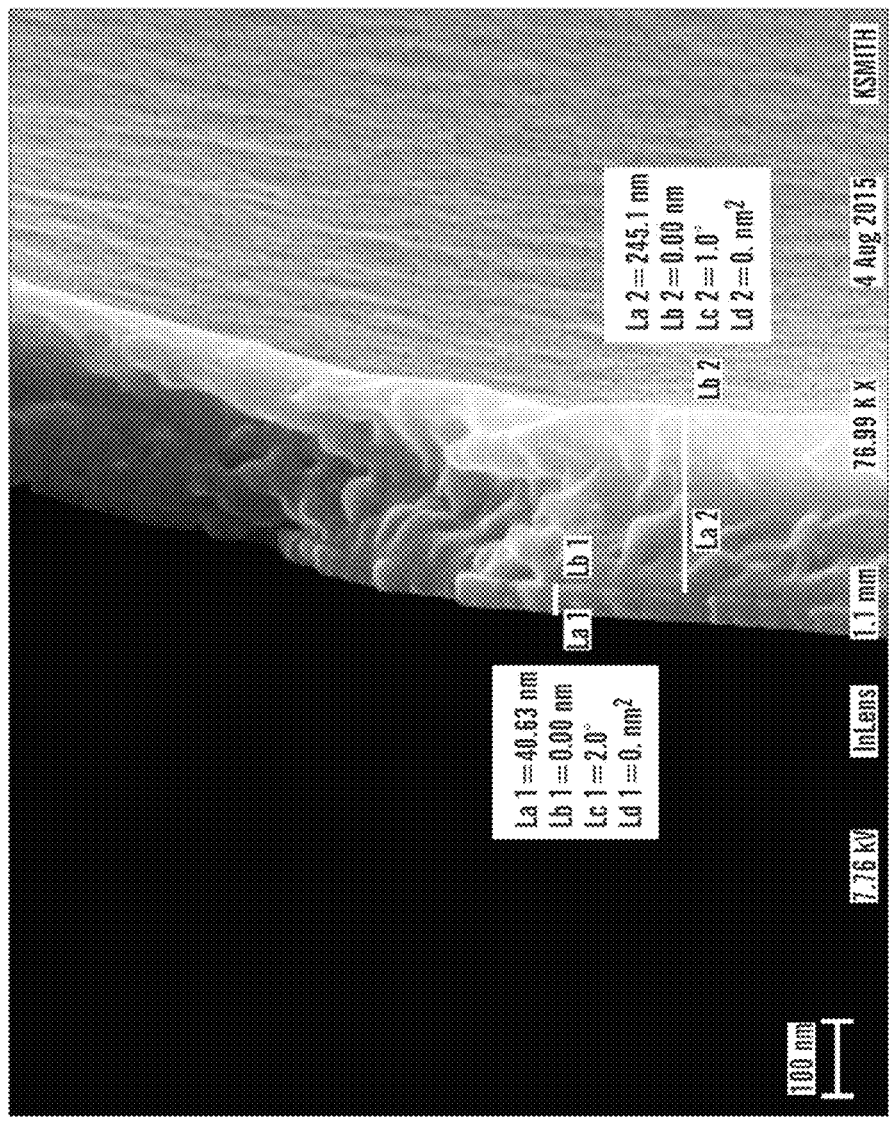
FIG. 5a is an SEM image of a freestanding Nafion recast membrane over a pnc-Si substrate.
Figure 6A:
FIG. 6 is a picture of a thin recast film of Nafion over a pnc-Si substrate yielding the thinner recast over the porous regions in accordance with an embodiment of the present disclosure.
Figure 6B:
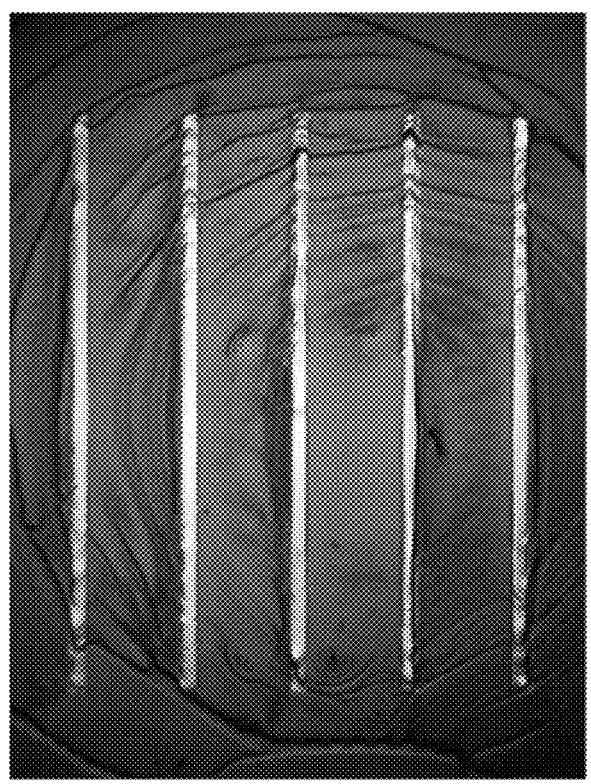

A typical, specific, detailed example of the disclosure was demonstrated by the production of an ultra-thin nanometer-scale freestanding Nafion recast membrane. The 5-wt % LIQUION solution (i.e., liquid Nafion), anhydrous 2-propanol (solvent), and a 30 nm-thick porous nanocrystalline silicon (pnc-Si) membrane were used as the solution of resin dispersion, solvent as diluent, and substrate, respectively. The pnc-Si membrane contained nanopores with the diameter of 28.6±13.4 nm and porosity of 0.075. Thus, in this example, the average pore aspect ratio was approximately 1. The LIQUION solution is diluted before puddle casting. For 1:9 dilution, one volume of LIQUION solution was mixed with nine volumes of anhydrous 2-propanol. 1 µL of the 1:9 diluted LIQUION solution was dispensed on the first side of the 30 nm-thick pnc-Si substrate. The puddle of the solution should cover the entire porous regions of the substrate. The solvent was allowed to evaporate from the puddle to the atmosphere at room temperature of about 20° C. As a result, the recast film was formed on the first side of the substrate as shown in FIG. 6a. Then, the first side containing the recast film was confined in a 0.25 cm$^2$ enclosed space. A 4 µL of anhydrous 2-propanol was dispensed on the second side of the substrate, covering the entire porous regions. It took about 10 minutes before the solvent completely evaporated into the ambient atmosphere at room temperature, thus giving the solvent evaporation rate of 0.4 µL per min. The recast on the first side became thinner and more uniform as shown in FIG. 6b due to simultaneous shrinking of the recast in non-porous regions and stretching of the recast in porous regions. The analysis by the scanning electron microscopy (SEM) showed the thickness of the Nafion recast of 245 nm over a 30 nm-thick (nominal, actual is 40.63 nm) pnc-Si substrate as demonstrated in FIG. 5a.

Example 2

Figure 5B:
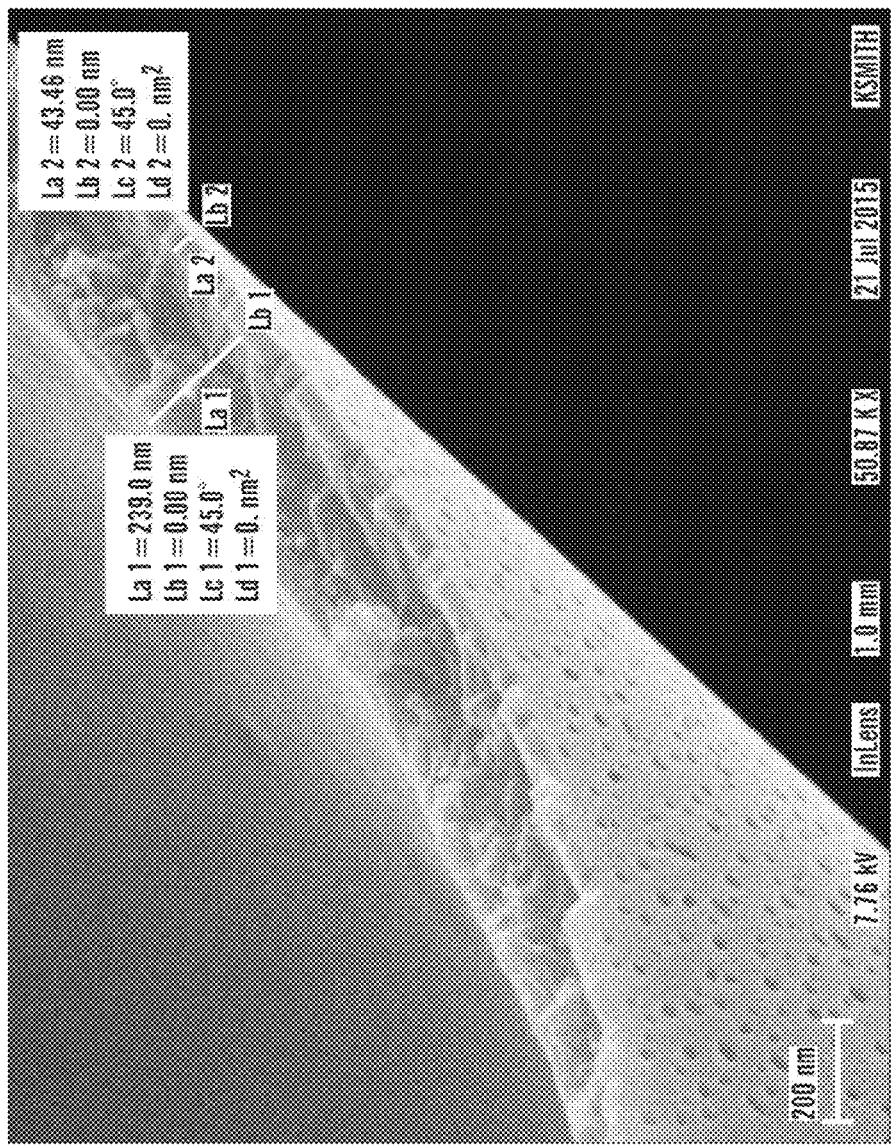
FIG. 5b is an SEM image of a freestanding Nafion recast membrane over a SiN substrate.

Following the same process as Example 1, but with a nanoporous nitride (NPN) membrane as the substrate for the Nafion recast. The silicon nitride substrate had a thickness of 43 nm and contained nanopores with the average diameter of 35 nm and the porosity ranging from 0.08 to 0.17. The resulting Nafion recast membrane had a thickness of 239 nm as shown in FIG. 5b.

Example 3

Following the same process as Example 1, the undiluted LIQUION solution or with dilution ratio lower than 1:9 tended to rupture rectangular windows of 0.1 mm×3 mm on the pnc-Si substrate during solvent evaporation. However smaller porous regions such as an array of 0.1 mm×0.1 mm square windows would be robust and resist rupture to guarantee a pin-hole free membrane.

Example 4

Following the same process as Example 1, the Nafion membrane produced from a mixture with dilution ratio higher than 1:19 did not cover the entire porous substrate.

Example 5

Following the same process as Example 1, but on a pnc-Si membrane containing defects with unusually large pores, with the diameter of 110 nm or larger, the Nafion was washed away by the solvent.

Example 6

Following the process of Example 1, the process of making the ultra-thin nanometer-scale freestanding recast membranes has been tested experimentally with the solution of Nafion dispersion. The tests were performed with the solutions of different degrees of dilution with 2-propanol, and the resulting membrane thickness was verified by the scanning electron microscopy (SEM).

An ultrathin freestanding Nafion membrane was produced by recasting the Nafion dispersion in 2-propanol over a nanoporous substrate. The nanoporous substrate was a 30 nm-thick porous nanocrystalline silicon (pnc-Si) with average pore diameter of 30 nm and porosity of 7.5%. The thickness of Nafion membrane ranged from approximately 250 nm with a dilution ratio of 1:9, down to about 100 nm with a dilution ratio of 1:19. The higher the dilution ratio of the polymer dispersion, the thinner the membrane is expected.

EXAMPLES—ULTRA-THIN NANOMETER-SCALE FREESTANDING CROSS-LINKED MEMBRANES WITH SOLID BACKBONE

Example 7

A typical, specific, detailed paper example of the method can be demonstrated by the synthesis of an ultra-thin nanometer-scale freestanding aromatic polyamide membrane. An aqueous solution of m-phenylenediamine and an organic solution of 1,3,5-benzenetricarbonyl chloride in hexane represents two immiscible solutions of two monomers. A 30 nm-thick porous nanocrystalline silicon (pnc-Si) membrane with average pore diameter and porosity of 30 nm and 7.5% can be used as the ultra-thin nanoporous support. In the synthesis, a specific formula can be 2% (w/v) m-phenylenediamine in DI water and 0.1% (w/v) 1,3,5-benzenetricarbonyl chloride in hexane. First, the pnc-Si membrane can be floated over a reservoir of the aqueous solution of m-phenylenediamine on the first side of the membrane. Then, a 4-µL droplet of 1,3,5-benzenetricarbonyl chloride in hexane can be introduced on the second side of the membrane, covering all porous regions. After 1 minute of reaction, the pnc-Si membrane can be removed from the reservoir and then the droplet can be blotted up by a Kim-Wipe. The pnc-Si substrate can be rinsed with the aqueous solution of sodium carbonate to neutralize the pH. The thickness of the synthesized polyamide membrane should be about 50 nm, capping the porous regions of the 30 nm-thick pnc-Si membrane from both sides.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A process for producing an ultra-thin nanometer-scale polymeric membrane comprising:
   forming a polymer film on a first side of a nanoporous substrate;
   swelling the polymer film on the first side of the nanoporous substrate by applying a solvent on a second side of the nanoporous substrate opposite the first side which migrates through the nanoporous substrate to the first side; and
   evaporating the solvent from the second side of the nanoporous substrate while limiting evaporation of the solvent from the first side of the nanoporous substrate.

2. The process of claim 1, wherein the forming a polymer film on a first side of a nanoporous substrate comprises:
dispensing a solution of resin dispersion in a solvent over the first side of the nanoporous substrate, wherein the nanoporous substrate comprises a porous region and non-porous regions surrounding the porous region;
allowing the solution to spread over the porous region and non-porous regions of the first side of the nanoporous substrate; and
allowing the solvent to evaporate yielding a thin film recast on the porous and non-porous regions of the first side of the nanoporous substrate.

3. The process of claim 1, wherein the evaporating the solvent from the second side of the nanoporous substrate while limiting evaporation of the solvent from the first side of the nanoporous substrate comprises confining the polymer film formed on the first side of the nanoporous substrate in an enclosed space.

4. The process of claim 1, wherein the swelling the polymer film on the first side of the nanoporous substrate by applying a solvent on a second side of the nanoporous substrate opposite the first side further comprises flipping the substrate over prior to applying the solvent on the second side of the substrate.

5. The process of claim 1, wherein the formed polymer film is a recast film.

6. The process of claim 1, wherein the nanoporous substrate comprises a porous region and non-porous regions surrounding the porous region and the porous region of the substrate is about tens of nanometers thick.

7. The process of claim 1, wherein the nanoporous substrate comprises a porous region and non-porous regions surrounding the porous region and the nanoporous region of the substrate is up to about 1 micrometer thick.

8. The process of claim 1, wherein the nanoporous substrate comprises a porous region and non-porous regions surrounding the porous region and the nanoporous region of the substrate has a porosity up to about 20%.

9. The process of claim 1, wherein the nanoporous substrate comprises a porous region and non-porous regions surrounding the porous region and the nanoporous region of the substrate has a porosity up to about 50%.

10. The process of claim 1, wherein the pore diameter of the nanoporous substrate is less than about 100 nm.

11. The process of claim 1, wherein the pore diameter of the nanoporous substrate is less than about 50 nm.

12. The process of claim 1, wherein the substrate is a porous nanocrystalline silicon (pnc-Si) membrane.

13. The process of claim 1, wherein the substrate is a nanoporous silicon nitride (SiN) membrane.

14. The process of claim 1, wherein the nanoporous substrate comprises a porous region and non-porous regions surrounding the porous region and evaporating the solvent from the second side of the nanoporous substrate while limiting evaporation of the solvent from the first side of the nanoporous substrate simultaneously shrinks the polymer film formed over the non-porous regions and stretches the film formed over the porous region on the first side of the nanoporous substrate.

* * * * *